United States Patent
Minehara et al.

(10) Patent No.: US 8,672,143 B2
(45) Date of Patent: *Mar. 18, 2014

(54) COMPOSITE SEMIPERMEABLE MEMBRANE

(75) Inventors: Hiroki Minehara, Otsu (JP); Koji Nakatsuji, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/579,138

(22) PCT Filed: Mar. 28, 2011

(86) PCT No.: PCT/JP2011/057637
§ 371 (c)(1),
(2), (4) Date: Sep. 24, 2012

(87) PCT Pub. No.: WO2011/122560
PCT Pub. Date: Oct. 6, 2011

(65) Prior Publication Data
US 2013/0032530 A1     Feb. 7, 2013

(30) Foreign Application Priority Data

Mar. 30, 2010   (JP) ................................. 2010-077003

(51) Int. Cl.
| | | |
|---|---|---|
| *B01D 71/06* | (2006.01) | |
| *B01D 39/00* | (2006.01) | |
| *B01D 39/14* | (2006.01) | |
| *B01D 29/46* | (2006.01) | |
| *B01D 67/00* | (2006.01) | |
| *B05D 5/00* | (2006.01) | |
| *B01D 71/70* | (2006.01) | |

(52) U.S. Cl.
CPC ..................................... *B01D 71/70* (2013.01)
USPC ................ 210/500.27; 210/500.35; 210/490; 210/500.34; 427/244; 264/41; 264/48

(58) Field of Classification Search
CPC ....................................................... B01D 71/70
See application file for complete search history.

(56) References Cited

U.S. PATENT DOCUMENTS

| | | |
|---|---|---|
| 2002/0061432 A1 | 5/2002 | Nakano et al. |
| 2004/0038105 A1 | 2/2004 | Hennige et al. |
| 2004/0101760 A1 | 5/2004 | Kerres et al. |
| 2006/0194096 A1 | 8/2006 | Valle et al. |
| 2011/0139708 A1* | 6/2011 | Okabe et al. ............. 210/500.21 |
| 2012/0157579 A1* | 6/2012 | Parent et al. ..................... 524/35 |

FOREIGN PATENT DOCUMENTS

| | | |
|---|---|---|
| JP | 6-64601 A | 3/1994 |
| JP | 11-310720 A | 11/1999 |
| JP | 2002-110200 A | 4/2002 |
| JP | 2004-501229 A | 1/2004 |
| JP | 2004-515351 A | 5/2004 |
| JP | 2006-519287 A | 8/2006 |
| WO | WO 2010/113656 A1 | 10/2010 |

* cited by examiner

*Primary Examiner* — Lore Jarrett
*Assistant Examiner* — Benjamin J Behrendt
(74) *Attorney, Agent, or Firm* — Birch, Stewart, Kolasch & Birch, LLP

(57) ABSTRACT

Disclosed is a composite semipermeable membrane, which comprises a separation functional layer on a microporous support, and in which the separation functional layer is made of a condensation product of a polymer that has acidic groups and a trialkoxysilane groups having an imidazolium structure in side chains. The composite semipermeable membrane has excellent selective separation performance for divalent ions over monovalent ions, while exhibiting excellent long-term durability. Also disclosed is a method for producing the composite semipermeable membrane. The composite semipermeable membrane is suitable for uses in various water treatment fields such as the desalination of seawater and the production of drinking water. In addition, the composite semipermeable membrane does not deteriorate as much as conventional composite semipermeable membrane even in cases where the membrane is sterilized by having chlorine-containing raw water permeate therethrough continuously or intermittently.

3 Claims, No Drawings

COMPOSITE SEMIPERMEABLE MEMBRANE

TECHNICAL FIELD

The present invention relates to a composite semipermeable membrane for selectively separating a component of a liquid mixture, and a production method thereof. In detail, this invention relates to a composite semipermeable membrane consisting of a separation functional layer and a microporous support for supporting it and excellent in selective separation performance.

BACKGROUND ART

There are various techniques for removing a material (for example, a salt) dissolved in a solvent (for example, water), and in recent years, as a low cost process for energy saving and resource saving, a membrane separation process has been positively used in the water treatment field. Typical membranes used in the membrane separation process include microfiltration membranes, ultrafiltration membranes, nanofiltration membranes (NF membranes) and reverse osmosis membranes (RO membranes).

The RO membranes and NF membranes are mostly composite semipermeable membranes, and most of them are of a type in which a gel layer and a thin layer (separation functional layer) obtained by crosslinking a polymer are formed on a microporous support and of a type in which a thin layer (separation functional layer) obtained by polycondensing a monomer is formed on a microporous support. As the materials of these thin layers, crosslinked polyamides are popularly used. Above all, a composite semipermeable membrane in which a microporous support is covered with a thin layer made of a crosslinked polyamide obtained by a polycondensation reaction between a polyfunctional amine and a polyfunctional acid halide, as described in patent documents 1 and 2, is widely applied as a reverse osmosis membrane or NF membrane, since it is likely to be high in water permeability and salt removal rate.

Economic factors in the water treatment using RO and NF membranes include desalting performance and also ion selective separation performance. For example, in the case where it is desired to transmit monovalent ions and to block divalent ions, if a membrane with low selective separation performance is used, the ion concentration excessively increases on one side of the membrane, to increase the osmotic pressure on the same side of the membrane. If the osmotic pressure on one side increases, more and more ions are going to permeate through the membrane, in order to achieve the balance between the pressures on both sides of the membrane. Consequently a larger pressure is necessary to forcibly make the desalted water permeate through the membrane. As a result, high energy is required to raise the cost of water treatment.

The present RO and/or NF membranes are insufficient in the selective separation performance for separating divalent ions from monovalent ions and are high in the total salt removal rate. Consequently, a high osmic pressure is formed on both sides of each membrane, and in order to achieve a practical flow velocity, a higher pressure, i.e., higher energy is necessary unsatisfactorily in view of energy saving.

On the other hand, in the field of materials, organic/inorganic hybrid materials are known, which are obtained by combining a hydrophilic organic polymer and a condensation product of a silicon compound by utilizing molecular interaction. (see, for example, Patent Documents 3 and 4 and Non-Patent Document 1). However, such materials have not been previously used in industrial applications.

PRIOR ART DOCUMENTS

Patent Documents

Patent document 1: JP 1-180208 A
Patent document 2: JP 2005-144211 A
Patent document 3: JP 11-310720 A
Patent document 4: WO 2004/067611

Non-Patent Document

Non-patent document 1: "Chemistry Letters", vol. 37, The Chemical Society of Japan, 2008, pages 580-581

SUMMARY OF THE INVENTION

Problem to be Solved by the Invention

In view of the abovementioned problem, the object of this invention is to provide a composite semipermeable membrane excellent in the selective separation performance for separating divalent ions from monovalent ions and excellent also in long-term durability, and to provide a production method thereof.

Means for Solving the Problem

The present invention for achieving the abovementioned object has the following configuration.

(I) A composite semipermeable membrane having a separation functional layer on a microporous support, in which the separation functional layer is made of a condensation product of a polymer having acid groups and functional groups represented by general formula (1) in side chains.

[Chemical formula 1]

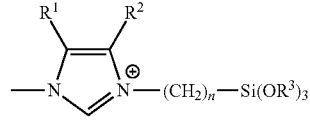

(1)

(in the general formula (1), n denotes an integer of 1 to 4; $R^1$ and $R^2$ can be selected respectively arbitrarily from a hydrogen atom and hydrocarbon group with 1 to 7 carbon atoms or can also be covalently bonded together; and $R^3$ denotes a hydrogen atom or alkyl group with 1 to 4 carbon atoms).

(II) A composite semipermeable membrane, according to (I), wherein the acid groups are at least one type selected from carboxyl groups, sulfonic acid groups, and phosphonic acid groups.

(III) A composite semipermeable membrane, according to (I) or (II), wherein the polymer is obtained by polymerizing a compound represented by general formula (2) and at least one compound having an acid group and a polymerizable double bond.

[Chemical formula 2]

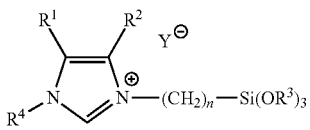

(2)

(in the general formula (2), n denotes an integer of 1 to 4; $R^1$ and $R^2$ can be selected respectively arbitrarily from a hydrogen atom and hydrocarbon group with 1 to 7 carbon atoms or can also be covalently bonded together; $R^3$ denotes a hydrogen atom or alkyl group with 1 to 4 carbon atoms; $R^4$ denotes a functional group having a polymerizable double bond; and $Y^-$ denotes an arbitrary anion).

Effects of the Invention

According to this invention, a composite semipermeable membrane excellent in the selective separation performance for separating divalent ions from monovalent ions can be obtained. Since the composite semipermeable membrane of this invention is excellent in selective separation performance, it is economically superior to conventional composite semipermeable membranes, and even if the membrane is sterilized by continuously or intermittently passing chlorine-containing water, it is not deteriorated so much as the conventional composite semipermeable membranes.

MODES FOR CARRYING OUT THE INVENTION

In the composite semipermeable membrane of this invention, a microporous support substantially not having separation performance is covered with a separation functional layer (thin layer) substantially having separation performance.

In this invention, the microporous support does not substantially have the separation performance for separating ions or the like and gives strength to the separation functional layer substantially having separation performance. There are no particular limits regarding the size and distribution of the pores formed in the microporous support. For example, preferred is a microporous support having uniform and fine pores or having fine pores showing gradually increasing change from the surface of the side where the separation functional layer is formed to the other surface and having fine pores with a size of 0.1 nm to 100 nm on the surface of the side where the separation functional layer is formed.

There are no particular limits regarding the material used for the microporous support and the form thereof, and usually the microporous support is configured as a porous support formed on a substrate. For example, a polysulfone, cellulose acetate, polyvinyl chloride or a mixture thereof (porous support) reinforced by a cloth (substrate) with at least one selected, for example, from polyesters and aromatic polyamides as a main component can be preferably used. As the material used for the porous support, it is especially preferred to use a polysulfone with high chemical, mechanical and thermal stability.

Specifically it is preferred to use a polysulfone comprising repeating units represented by the following chemical formula for such reasons that the pore size can be easily controlled and that high dimensional stability can be obtained.

[Chemical formula 3]

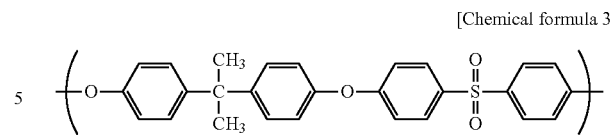

For example, an N,N-dimethylformamide (DMF) solution of the abovementioned polysulfone can be cast onto a densely woven polyester fabric or nonwoven fabric in a certain thickness, and is solidified in water by a wet process, to obtain a microporous support with a surface occupied mostly by fine holes with a diameter of less than tens of nanometers.

The thickness of the microporous support affects the strength of the composite semipermeable membrane and the packing density of the element obtained by using the composite semipermeable membrane. In order to obtain sufficient mechanical strength and packing density, it is preferred that the thickness is in a range from 50 μm to 300 μm. A more preferred range is 100 μm to 250 μm. Further, it is preferred that the thickness of the porous support in the microporous support is in a range from 10 μm to 200 μm, and a more preferred range is 30 μm to 100 μm.

The structure of the porous support can be observed by using a scanning electron microscope, transmission electron microscope or atomic force microscope. For example, in case of observation using a scanning electron microscope, the porous support is removed from the substrate and cut by a freeze-fracture method, to obtain a sample for observing the cross section. The sample is thinly coated with platinum, platinum-palladium or ruthenium tetrachloride, preferably ruthenium tetrachloride, and the coated sample is observed at an accelerating voltage of 3 to 6 kV by using a high-resolution field-emission scanning electron microscope (UHR-FE-SEM). As the high-resolution field-emission scanning electron microscope, S-900 electron microscope produced by Hitachi or the like can be used. From the obtained electron microscope photograph, the thickness and the surface pore size of the porous support are decided. Meanwhile, the thickness and the pore size in this invention are mean values obtained by measuring five times respectively.

Next, the separation functional layer is a layer substantially having separation performance and is made of a condensation product of a polymer having acid groups and the functional groups represented by the general formula (1). In the separation functional layer, it is considered that the acid groups and the functional groups represented by the general formula (1) are ionically bonded to each other, to provide the effects desired in this invention.

The method presented as an example for forming the separation functional layer can be method comprising the step of coating a coating solution containing at least one compound having an acid group and at least one polymerizable double bond and a compound represented by the abovementioned general formula (2), the step of removing the solvent, the step of polymerizing the polymerizable double bonds, and the step of condensing the hydrolyzable groups in this order. In the step of polymerizing the polymerizable double bonds, the hydrolyzable groups may also be condensed simultaneously.

In the abovementioned production method, the method for obtaining the coating solution can be, for example, a method of dissolving or dispersing at least one compound having an acid group and at least one polymerizable double bond and a compound represented by the general formula (2) into a solvent. However, the method is not limited, if the coating solution contains the two compounds. Meanwhile, the compound having an acid group and at least one polymerizable double bond and the compound represented by the general formula (2) are partially ionized in water in response to the dissociation equilibrium constant thereof.

Further, there are no particular limits regarding the method for coating the microporous support with the coating solution, and any of various publicly known methods such as dip coating, spin coating, spray coating and brush coating can be used for coating. However, in this invention, it is preferred to employ a method of placing an appropriate amount of the coating solution on the microporous support and subsequently covering it with a film such as a polyester film incapable of being changed in polymerization degree by contact with the solvent, for allowing the covered microporous support to stand. The reasons are that the necessary amount of the coating solution can be small and that the operation is simple. In this case, it is preferred that the time during which the covered support is allowed to stand is 30 seconds to 2 minutes. Further, it is desirable that after the film is removed, sufficient draining is performed in order not to leave liquid droplets on the film layer. Sufficient draining can prevent that the liquid droplet remaining portions become layer defects after layer formation, to lower the layer performance. As the draining method, a method of forcibly draining by spraying a gas such as nitrogen from an air nozzle or the like can be used.

In the abovementioned production method, after the microporous support is coated with the coating solution, irradiation with an energy beam and subsequent heating for drying are performed to obtain the composite semipermeable membrane of this invention. In this case, the irradiation with an energy beam is considered to cause the copolymerization between the at least one compound having an acid group and at least one polymerizable double bond and the compound represented by the general formula (2), the homo-polymerization of the compound having an acid group and at least one polymerizable double bond and the homo-polymerization of the compound represented by the general formula (2). In view of workability, it is preferred that the time of the irradiation with an energy beam is 5 seconds to 30 minutes.

Further, the heating for drying condenses the functional groups represented by the general formula (1), to provide a condensation product. The heating temperature in this case is required to be lower than the temperature at which the microporous support is melted to lower the performance as the separation membrane. In order to expedite the condensation reaction, it is usually preferred to heat at 0° C. or higher, and more preferred is 20° C. or higher. Furthermore, it is preferred that the aforementioned reaction temperature is 150° C. or lower. If the reaction temperature is 0° C. or higher, the hydrolysis and condensation reaction take place quickly, and at 150° C. or lower, the hydrolysis and condensation reaction can be easily controlled. Moreover, if a catalyst for accelerating the hydrolysis or condensation is added, the reaction can take place even at a lower temperature. Further, in this invention, the heating and humidity conditions are selected in order that the separation functional layer may have pores and that the condensation reaction can take place appropriately.

It is preferred that the composite semipermeable membrane obtained by the abovementioned production method is immersed in an alcohol aqueous solution for 1 minute to 20 minutes, to be hydrophilized. The reason is that the alcohol is soluble in water and is likely to be familiar also with a hydrophobic membrane surface, and therefore can hydrophilize the membrane surface and can enhance the amount of fresh water generated by the membrane. As the alcohol aqueous solution used for hydrophilization, it is general to use 10% isopropyl alcohol aqueous solution.

The acid groups in this invention include sulfonic acid groups, sulfinic acid groups, carboxyl groups, phosphonic acid groups, phosphinic acid groups, hydroxyl groups, thiol groups, etc., though not limited thereto. In this invention, among these acid groups, in view of acidity and availability of the reagent, it is preferred to use at least one type selected from carboxyl groups, sulfonic acid groups and phosphonic acid groups.

In this invention, in view of the simplicity in synthesizing the polymer having acid groups and the functional groups represented by the general formula (1) and the facility in preparing the ionic bonds formed between the acid groups and the functional groups represented by the general formula (1), it is preferred that the polymer having acid groups and the functional groups represented by the general formula (1) is obtained by polymerizing at least one compound having at least one polymerizable double bond and a compound represented by the general formula (2).

Examples of the polymerizable double bond in this invention include a (meth)acryloyl group, (meth)acryloyloxy group, (meth)acrylamide group, allyl group, vinyl group, styryl group, and the like, though not limited thereto.

The compound having an acid group and at least one or more polymerizable double bonds is explained below. Among the abovementioned compounds having an acid group and one or more polymerizable double bonds, as examples of the compound having a carboxylic acid group, the following can be enumerated: maleic acid, maleic anhydride, acrylic acid, methacrylic acid, 2-(hydroxymethyl) acrylic acid, 4-(meth)acryloyloxyethyltrimellitic acid and anhydride, 10-methacryloyloxydecylmalonic acid, N-(2-hydroxy-3-methacryloyloxypropyl)-N-phenylglycine and 4-vinylbenzoic acid.

Among the abovementioned compounds having an acid group and one or more polymerizable double bonds, as examples of the compound having a phosphoric acid group, the following can be enumerated: vinylphosphonic acid, 4-vinylphenylphosphonic acid, 4-vinylbenzylphosphonic acid, 2-methacryloyloxyethylphosphonic acid, 2-methacrylamide-ethylphosphonic acid, 4-methacrylamide-4-methylphenyl-phosphonic acid, 2-[4-(dihydroxyphosphoryl)-2-oxa-butyl]-acrylic acid and 2-[2-dihydroxyphosphoryl]-ethoxymethyl]-acrylic acid-2,4,6-trimethyl-phenyl ester.

Among the abovementioned compounds having an acid group and one or more polymerizable double bonds, as examples the compound of a phosphoric acid ester, the following can be enumerated: 2-methacryloyloxypropyl monohydrogen and dihydrogen phosphate, 2-methacryloyloxyethyl monohydrogen and dihydrogen phosphate, 2-methyacryloyloxyethyl-phenyl monohydrogen phosphate, dipentaerythritol-pentamethacryloyloxy phosphate, 10-methacryloyloxydecyl-dihydrogen phosphate, dipentaerythritolpentamethacryloyloxy phosphate, mono-(1-acryloyl-piperidine-4-yl)-ester phosphate, 6-(methacrylamide) hexyl dihydrogen phosphate and 1,3-bis(N-acryloyl-N-propyl-amino)-propane-2-yl)-dihydrogen phosphate.

Among the compounds having an acidic group and one or more polymerizable double bonds, as examples of the compound having a sulfonic acid group, enumerated are vinylsulfonic acid, 4-vinylphenylsulfonic acid and 3-(methacrylamide)propylsulfonic acid. Further examples include vinylsulfonic acid and salts thereof, allylsulfonic acid, o-styrenesulfonic acid and salts thereof, p-styrenesulfonic acid and salts thereof, m-styrenesulfonic acid and salts thereof, 2-vinylbenzoic acid and salts thereof, 3-vinylbenzoic acid and salts thereof, 4-vinylbenzoic acid and salts thereof, acrylic acid and salts thereof, methacrylic acid and salts thereof, 2-acryloyloxyethylsuccinic acid, 2-methacryloyloxyethylsuccinic acid, 3,5-diacrylamidebenzoic acid, vinylphosphonic acid, allylphosphonic acid, o-styrenephosphonic acid and salts thereof, p-styrenephosphonic acid, m-styrenephosphonic acid and salts thereof, etc.

In view of high selective separation performance of the obtained composite semipermeable membrane, as the compound represented by the general formula (2), a compound, in which each of $R^1$ and $R^2$ denotes a hydrogen atom, $R^4$ denotes an allyl group and n denotes 3, is preferred. Further, it is preferred that the acid groups of the polymer existing in the thin film are at least one type selected from carboxylic acid groups, sulfonic acid groups and phosphonic acid groups.

From the same viewpoint as mentioned above, in the abovementioned production method, it is preferred that the content of the compound represented by the general formula (2) in the coating solution is approx. 10 wt % to approx. 90 wt % based on the amount of the reactive composition. A more preferred range is approx. 10 wt % to approx. 50 wt %.

Further, this invention is characterized in that the acid groups and the imidazolium groups in the functional groups represented by the general formula (1) existing in the condensation product as the separation functional layer of the composite semipermeable membrane form ionic bonds.

As the solvent used in the coating solution, any solvent incapable of dissolving the microporous support and miscible with water can be used without any limitation, and as examples of the solvent, enumerated are alcohols such as methanol, ethanol, 1-propanol and 2-propanol and the like. In order to accelerate the condensation in the heating and drying step, it is preferred that the coating solution contains more than an equimolar amount of water with respect to the number of condensable functional groups among the functional groups represented by the general formula (1).

Further, a polymerization initiator, polymerization aid and other additives may be contained to such an extent that the effects of this invention are not impaired. In the production method of this invention, it is preferred to add a polymerization initiator, polymerization promoter and the like in order to enhance the polymerization reactivity. In this case, the polymerization initiator and the polymerization promoter are not especially limited, and can be selected as appropriate for adaptation to the structure of the compound containing one or more polymerizable double bonds, polymerization method, etc.

As the polymerization initiator, a publicly known polymerization initiator can be used without any limitation, if it can be dissolved in the solvent used. For example, usable are acetophenones such as 2,2-dimethoxy-1,2-diphenylethane-1-one, 1-hydroxy-cyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, 2-methyl-1-(4-methylthiophenyl)-2-morpholinopropane-1-one, 2-benzyl-2-dimethylamino-1-(4-morpholinophenyl)-butanone-1-one, 2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, bis(η5-2,4-cyclopentadiene-1-yl)-bis(2,6-difluoro-3-(1H-pyrrole-1-yl)-phenyl)titanium, 1,2-octanedione,1-[4-phenylthio]-,2-(0-benzoyloxime)], ethanone,1-[9-ethyl-6-(2-methylbenzoyl)-9H-carbazole-3-yl]-,1-(0-acetyloxime), 4-phenoxydichloroacetophenone, 4-t-butyl-dichloroacetophenone, 4-t-butyl-trichloroacetophenone, diethoxyacetophenone, 2-hydroxy-2-methyl-1-phenylpropane-1-one, 1-(4-dodecylphenyl)-2-hydroxy-2-methylpropane-1-one, 4-(2-hydroxyethoxy)-phenyl(2-hydroxy-2-propyl)ketone, 1-hydroxycyclohexylphenylketone and 2-methyl-1-[4-(methylthio)phenyl]-2-morpholinopropane-1-one, benzoins such as benzoin, benzoin methyl ether, benzoin ethyl ether, benzoin isopropyl ether and benzoin isobutyl ether, benzophenones such as benzophenone, benzoylbenzoic acid, 4-phenylbenzophenone, hydroxybenzophenone and allylatedbenzophenone, thioxanthones such as thioxanthone, 2-chlorothioxanthone, 2-methylthioxanthone and 2,4-dimethylthioxanthone, farther, 4,4-azobis(4-cyanovaleric acid), 7,7-azobis(7-cyanocaprylic acid), 6,6-azobis(6-cyano-6-cyclohexylcaproic acid), 2,2-azobis(2-methylpropionic acid), 2,2-azobis(2-ethyl-4-methoxyvaleric acid), 2,2-azobis(2-benzylpropionic acid), etc. As peroxide-based compounds, for example, succinic acid peroxide (trade name: Peroyl (registered trademark) SA) produced by NOF Corporation and the like can be used.

As the energy beam, ultraviolet light, plasma, gamma radiation, electron beam and the like can be used, but among them, in view of simplicity in device and handling, it is preferred to use ultraviolet light. It is more preferred to use a wavelength of 172 nm.

In the case where the polymerization degree of the polymer is too low, the polymer flows out of the separation functional layer, to produce defects, when the formed layer is washed with RO water. Therefore, it is preferred that the concentration of the polymerization initiator added is 5 wt % or less based on the weight of the reactive composition.

The composite semipermeable membrane of this invention formed as described above can be wound around a water collecting pipe with many holes drilled therethrough together with a raw water channel member such as a plastic net, a permeate channel member such as tricot, and, as required, a film for enhancing pressure resistance, for suitable use as a spiral composite semipermeable membrane element. Further, the elements, each as described above, can be connected in series or parallel to each other for use as a composite semipermeable membrane module accommodated in a pressure vessel.

Further, the abovementioned composite semipermeable membrane, the element thereof or the module thereof can be combined with a pump for supplying raw water thereto, a device for pretreating the raw water and the like, to configure a fluid separation apparatus. This separation apparatus can be used to separate the permeating water such as drinking water and the concentrated water not permeating the membrane, from the raw water, for obtaining water types suitable for respective purposes, and can be expected to be used for industrial applications.

EXAMPLES

This invention is explained below in more detail in reference to examples, but is not limited thereto or thereby.

Meanwhile, in the following examples, the removal rate (Rej) of each composite semipermeable membrane was calculated from the following formula (3), and the permeation rate (Flux) of each composite semipermeable membrane was calculated from the following formula (4).

Rej(%)={(Concentration of the feed liquid−Concentration of the permeate)/Concentration of the feed liquid}×100        Formula (3)

Flux(m/d)=(Amount of the permeate per day)/(Membrane area)        Formula (4)

Example 1

A dimethylformamide (DMF) solution containing 15.3 wt % of polysulfone was cast onto a 21 cm×15 cm polyester nonwoven fabric (air permeability 0.5 to 1 cc/cm²/sec) in a thickness of 200 µm at room temperature (25° C.), and the coated fabric was immediately immersed in pure water and allowed to stand for 5 minutes, for preparing a microporous support.

Two milliliters of a coating solution (A) consisting of 3.0 parts by weight of sodium p-styrenesulfonate, 2.0 parts by weight of 1-allyl-3-(3-trimethoxysilylpropyl)imidazolium chloride, 0.24 part by weight of 2,2-dimethoxy-1,2-diphenylethane-1-one and 94.76 parts by weight of 65% isopropyl alcohol aqueous solution was placed on the microporous support from which the water drops on the surface had been removed by nitrogen blowing, and a polyester film, LUMIRROR (registered trademark) produced by Toray Industries, Inc. was placed to cover the surface. The covered and coated microporous support was allowed to stand for 1 minute. The LUMIRROR (registered trademark) was removed, and the liquid drops on the surface were removed by nitrogen blowing. Subsequently Excimer Lamp UER20-172 produced by USHIO Inc. capable of irradiating with ultraviolet light of 172 nm was used to irradiate the coated microporous support with ultraviolet light for 10 minutes with a distance of 1 cm set between the lamp and the microporous support. Then, a hot air dryer was used to dry at 120° C. for 2 hours, to obtain a composite semipermeable membrane.

The composite semipermeable membrane obtained like this was immersed in 10% isopropyl alcohol aqueous solution for 10 minutes, and then 500 ppm saline adjusted to pH 6.5 was used as the feed liquid, to perform a reverse osmosis test at 0.75 MPa and 25° C. As a result, the performance shown in Table 1 could be obtained. Further, likewise, 1500 ppm $MgSO_4$ aqueous solution was used as the feed liquid, to perform a reverse osmosis test at 0.75 MPa and 25° C., and the results are shown in Table 1.

Example 2

A composite semipermeable membrane was prepared as described in Example 1, except that a coating solution (B) consisting of 1.5 parts by weight of sodium p-styrenesulfonate, 3.5 parts by weight of 1-allyl-3-(3-trimethoxysilylpropyl)imidazolium chloride, 0.15 part by weight of 2,2-dimethoxy-1,2-diphenylethane-1-one and 94.76 parts by weight of 65% isopropyl alcohol aqueous solution was used instead of the coating solution (A) and that the step of irradiating the coated microporous support with ultraviolet light for 30 minutes by using a UV irradiation device, TOSCURE752 produced by Harison Toshiba Lighting Corporation capable of irradiating with ultraviolet light of 365 nm and setting the irradiation intensity at 20 mW/cm² was performed instead of the step of irradiating with ultraviolet light for 10 minutes by using Excimer Lamp UER20-172 produced by USHIO Inc. capable of irradiating with ultraviolet light of 172 nm and setting the distance between the irradiation window and the microporous support at 1 cm. Further, the composite semipermeable membrane obtained like this was evaluated as described in Example 1, and the performance shown in Table 1 was obtained.

Example 3

A composite semipermeable membrane was prepared as described in Example 1, except that 1-(2-acryloylethyl)-3-(3-trimethoxysilylpropyl)imidazolium chloride was used instead of the 1-ally-3-(3-trimethoxysilylpropyl)imidazolium chloride used in Example 1. Further, the composite semipermeable membrane obtained like this was evaluated as described in Example 1, and the performance shown in Table 1 was obtained.

Example 4

A composite semipermeable membrane was prepared as described in Example 1, except that 1-(4-vinylbenzyl)-3-(3-trimethoxysilylpropyl)imidazolium chloride was used instead of the 1-ally-3-(3-trimethoxysilylpropyl)imidazolium chloride used in Example 1. Further, the composite semipermeable membrane obtained like this was evaluated as described in Example 1, and the performance shown in Table 1 was obtained.

Example 5

A composite semipermeable membrane was prepared as described in Example 1, except that 1-vinyl-3-(3-trimethoxysilylpropyl)imidazolium chloride was used instead of the 1-ally-3-(3-trimethoxysilylpropyl)imidazolium chloride used in Example 1. Further, the composite semipermeable membrane obtained like this was evaluated as described in Example 1, and the performance shown in Table 1 was obtained.

Example 6

A composite semipermeable membrane was prepared as described in Example 1, except that a coating solution (C) consisting of 0.8 part by weight of acrylic acid, 3.0 parts by weight of 1-allyl-3-(3-trimethoxysilylpropyl)imidazolium chloride, 0.14 part by weight of 2,2-dimethoxy-1,2-diphenylethane-1-one and 96.06 parts by weight of 65% isopropyl alcohol aqueous solution was used instead of the coating solution (A) used in Example 1. Further, the composite semipermeable membrane obtained like this was evaluated as described in Example 1, and the performance shown in Table 1 was obtained.

Example 7

A composite semipermeable membrane was prepared as described in Example 1, except that a coating solution (C) consisting of 1.0 part by weight of p-vinylbenzoic acid, 3.0 parts by weight of 1-allyl-3-(3-trimethoxysilylpropyl)imidazolium chloride, 0.14 part by weight of 2,2-dimethoxy-1,2-diphenylethane-1-one and 95.86 parts by weight of 65% isopropyl alcohol aqueous solution was used instead of the coating solution (A) used in Example 1. Further, the composite semipermeable membrane obtained like this was evaluated as described in Example 1, and the performance shown in Table 1 was obtained.

Comparative Example 1

The microporous support prepared by the same method as that of Example 1 was coated with an aqueous solution containing 0.8 wt % of piperazine, 0.2 wt % of 1,3-bis(4-piperidyl)propane, 0.5 wt % of a surfactant (Newcol 271A produced by Nippon Nyukazai Co., Ltd.) and 1.0 wt % of trisodium phosphate, and the coated microporous support was drained by an air knife and then dried in hot air of 120° C. for 40 seconds. Subsequently, it was coated with a decane solution containing 0.3 wt % of trimesic acid chloride, and then the coated microporous support was heat-treated by hot air of 100° C. for 5 minutes, to perform a reaction. It was then coated with an alkali aqueous solution containing 5.0 wt % of sodium carbonate and 0.1 wt % of sodium dodecyl sulfate, to terminate the reaction, for obtaining a composite semipermeable membrane. Further, the composite semipermeable membrane obtained like this was evaluated as described in Example 1, and the performance shown in Table 1 was obtained.

As can be seen from Table 1, the composite semipermeable membrane obtained in Comparative Example 1 was found to be inferior in the selective separation performance for separating divalent ions from monovalent ions compared with the composite semipermeable membranes obtained in Examples 1 to 7.

Comparative Example 2

A composite semipermeable membrane was prepared as described in Example 1, except that 3-methyl-1-(3-trimethoxysilylpropyl)imidazolium chloride was used instead of 1-ally-3-(3-trimethoxysilylpropyl)imidazolium chloride. Further, the composite semipermeable membrane obtained like this was evaluated as described in Example 1, and the performance shown in Table 1 was obtained.

As can be seen from Table 1, the salt removal performance of the composite semipermeable membrane obtained in Comparative Example 2 was found to be lower in MgSO$_4$ removal performance, and therefore the composite semipermeable membrane of Comparative Example 2 was found to be inferior in the selective separation performance for separating divalent ions from monovalent ions compared with the composite semipermeable membranes obtained in Examples 1 to 7.

Comparative Example 3

A composite semipermeable membrane was prepared as described in Example 1, except that 3-chloropropyltrimethoxysilane was used instead of 1-ally-3-(3-trimethoxysilylpropyl)imidazolium chloride. Further, the composite semipermeable membrane obtained like this was evaluated as described in Example 1, and the performance shown in Table 1 was obtained.

As can be seen from Table 1, the salt removal performance of the composite semipermeable membrane obtained in Comparative Example 3 was very inferior compared with the composite semipermeable membranes obtained in Examples 1 to 7.

Comparative Example 4

A composite semipermeable membrane was prepared as described in Example 1, except that the reaction solution of Example 1 did not contain 1-ally-3-(3-trimethoxysilylpropyl)imidazolium chloride, but contained 5 wt % of sodium p-styrenesulfonate. The obtained composite semipermeable membrane was evaluated as described in Example 1, and the results shown in Table 1 were obtained.

As can be seen from Table 1, the salt removal performance of the composite semipermeable membrane obtained in Comparative Example 4 was very inferior compared with the composite semipermeable membranes obtained in Examples 1 to 7.

Comparative Example 5

A composite semipermeable membrane was prepared as described in Example 1, except that the reaction solution of Example 1 did not contain sodium p-styrenesulfonate, but contained 5 wt % of 1-ally-3-(3-trimethoxysilylpropyl)imidazolium chloride. The obtained composite semipermeable membrane was evaluated as described in Example 1, and the results shown in Table 1 were obtained.

As can be seen from Table 1, the salt removal performance of the composite semipermeable membrane obtained in Comparative Example 5 was found to be lower in MgSO$_4$ removal performance, and the composite semipermeable membrane of Comparative Example 5 was found to be inferior in the selective separation performance for separating divalent ions from monovalent ions compared with the composite semipermeable membranes obtained in Examples 1 to 7.

TABLE 1

| | NaCl 500 ppm | | MgSO$_4$ 1500 ppm | |
|---|---|---|---|---|
| | Rej. (%) | Flux (m/d) | Rej. (%) | Flux (m/d) |
| Example 1 | 39.0 | 0.34 | 97.3 | 0.30 |
| Example 2 | 40.4 | 0.12 | 95.8 | 0.08 |
| Example 3 | 65.5 | 0.38 | 98.0 | 0.28 |
| Example 4 | 60.0 | 0.30 | 98.2 | 0.25 |
| Example 5 | 35.0 | 0.31 | 95.8 | 0.26 |
| Example 6 | 65.2 | 0.15 | 98.5 | 0.13 |
| Example 7 | 55.2 | 0.12 | 97.5 | 0.11 |
| Comparative Example 1 | 82.8 | 1.22 | 99.8 | 1.15 |
| Comparative Example 2 | 37.8 | 1.15 | 86.0 | 1.13 |
| Comparative Example 3 | 13.2 | 11.04 | 2.3 | 8.70 |
| Comparative Example 4 | 8.9 | 10.1 | 9.8 | 9.8 |
| Comparative Example 5 | 32.8 | 0.09 | 68.6 | 0.08 |

The invention claimed is:

1. A composite semipermeable membrane having a separation functional layer on a microporous support, in which the separation functional layer is made of a condensation product of a polymer having acid groups and functional groups represented by general formula (1) in side chains

[Chemical formula 1]

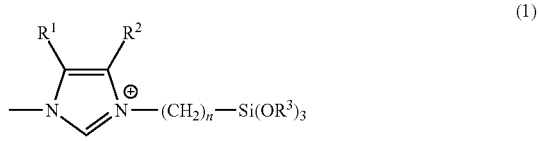

wherein, in the general formula (1): n denotes an integer of 1 to 4; $R^1$ and $R^2$ can be selected respectively arbitrarily from a hydrogen atom and hydrocarbon group with 1 to 7 carbon atoms or can also be covalently bonded together; and $R^3$ denotes a hydrogen atom or alkyl group with 1 to 4 carbon atoms.

2. A composite semipermeable membrane, according to claim 1, wherein the acid groups are at least one type selected from carboxyl groups, sulfonic acid groups, and phosphonic acid groups.

3. A composite semipermeable membrane, according to claim 1 or 2, wherein the polymer is obtained by polymerizing a compound represented by general formula (2) and a monomer or monomer mixture containing at least one compound having an acid group and a polymerizable double bond

[Chemical formula 2]

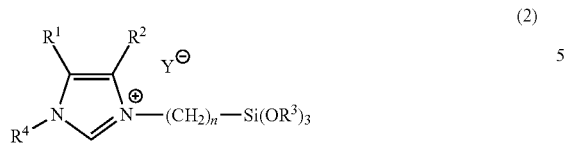

(2)

wherein, in the general formula (2): n denotes an integer of 1 to 4; $R^1$ and $R^2$ can be selected respectively arbitrarily from a hydrogen atom and hydrocarbon group with 1 to 7 carbon atoms or can also be covalently bonded together; $R^3$ denotes a hydrogen atom or alkyl group with 1 to 4 carbon atoms; $R^4$ denotes a functional group having a polymerizable double bond; and $Y^-$ denotes an arbitrary anion.

\* \* \* \* \*